METHOD OF COLOR TELEVISION USING SUBTRACTIVE FILTERS

Filed Aug. 3, 1962

INVENTOR.
Sam H. Kaplan
BY Francis W. Crotty
Atty.

United States Patent Office 3,248,477

Patented Apr. 26, 1966

3,248,477

METHOD OF COLOR TELEVISION USING SUBTRACTIVE FILTERS

Sam H. Kaplan, Chicago, Ill., assignor to The Rauland Corporation, Chicago, Ill., a corporation of Illinois Filed Aug. 3, 1962, Ser. No. 214,621
4 Claims. (Cl. 178—5.2)

Figure 1:
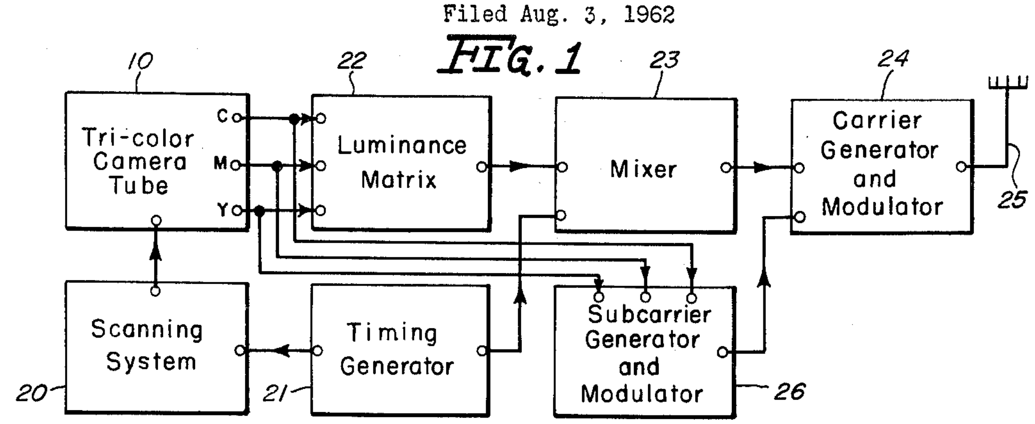

The present invention relates to a color television system and is most particularly concerned with the method of operating such a system.

Color television as practiced today is predicated on a three color additive system in which an object is scanned to derive electrical signals which represent its three primary color fields. At the receiving end of the system an image reproducer responds to such signals to, in effect, reproduce the three color fields of the image in superimposed relation to provide for the viewer an image in simulated natural color. It is of course known that the electrical signals representative of the primary color fields of an object being televised may be developed by the use of three camera tubes each of which sees an assigned color field or image of the object and accordingly produces an electrical signal corresponding to that field. It is also known that a tri-color single camera tube may be utilized in deriving the primary color signals for transmission. A tri-color camera tube suitable for this application is the vidicon. While the method of color television to be described herein has application to both forms of color television system, it has unique advantages when adapted to the tri-color camera tube and will therefore be described in that environment.

As heretofore constructed, the tri-color vidicon tube has a single electron gun for developing a cathode ray beam which is focused upon and scanned over a target structure. This target structure includes the face plate or screen area of the tube envelope to which are applied three series of filter elements interspersed with one another in accordance with a regular pattern of distribution. One series of filter elements, known as the red filters, absorbs blue and green but is transparent to red. Another series which is called the green filters suppresses red and blue and is transparent to green while the third series is transmissive essentially only to blue. Although the elementary filters may be arranged in a variety of patterns of distribution, it is convenient to arrange them in a repeating series of vertically extending strips having as small a horizontal dimension as practicable.

A transparent conductor overlies each of the filter strips with the conductors associated with filter elements of the same color connected to a common load impedance. A photoconductive layer overlies this assembly of filter strips and transparent conductors. When an image is focused on the target assembly and the beam is caused to scan that assembly in a repeating series of spaced parallel lines, three electrical signals are produced, one at each of the aforementioned load impedances and each corresponding to an assigned color image or field of the object being televised.

It will be appreciated that there are a number of circumstances in which it is most convenient to have an efficient tri-color camera available for color television and, while the described arrangement has been used with some success, it does not exhibit the high sensitivity that is desired. The loss in sensitivity may be directly attributable to the absorbing properties of the color filter elements. In theory each such element transmits approximately one-third of the incident light, assuming the image to have equal intensity at each of the primary colors, but in practice the transmissivity is found to be much less, being in a range of 10 to 20%.

It is, therefore, a principal object of the invention to provide a method of color television of improved sensitivity especially in respect of tri-color image pickup devices.

It is another object of the invention to provide a method of television characterized by high sensitivity but yet with no loss of color fidelity.

In accordance with the invention a method of translating an image of an object in a color television system comprises the steps of projecting an optical image of the object through a uni-planar filter system consisting of interspersed contiguous minus red, minus green and minus blue filter elements to develop a modified image composed of three complementary primary color components and developing an electrostatic charge image of the modified image. The method further comprehends the step of scanning the charge image to develop a first set of three color signals individually including two additive primary color components and collectively representing the luminance and chromaticity of the object in terms of a first color reference. A second set of color signals collectively representing the luminance and chromaticity of the object in terms of a second color reference, is derived from the first set of color signals. Finally, the method contemplates using the second set of color signals to reconstitute an image of the object in simulated natural color.

In one specific aspect of the invention, an image is scanned in the three complementary colors to derive a set of color signals which is then utilized in developing not only the luminance signal characteristic of a color transmission but also color difference signals for transmission to receivers usually in the form of complex modulation of a color subcarrier signal.

Figure 2:
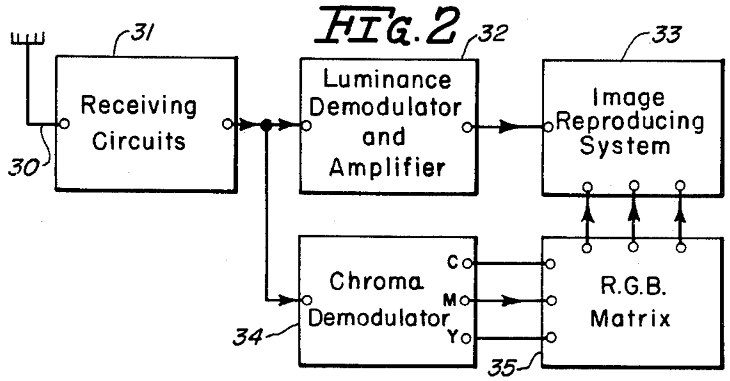
Figure 1A:
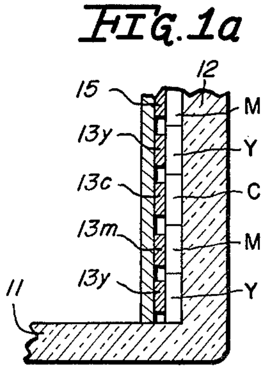
Figure 1B:
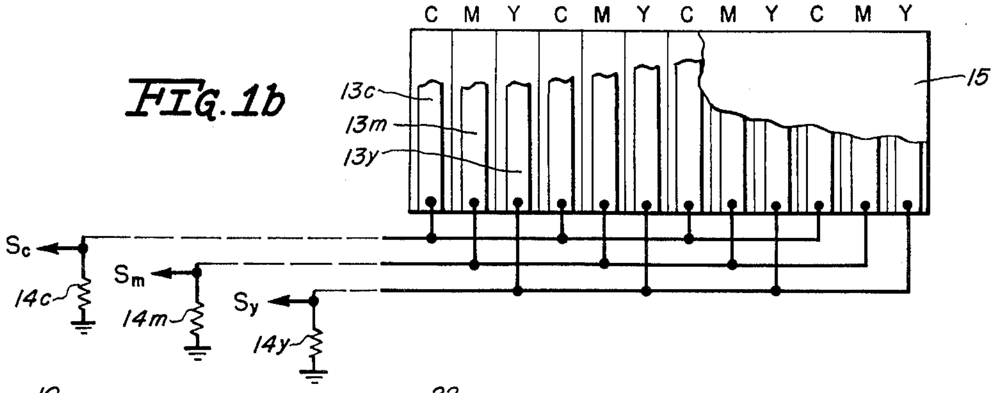
Figure 3:
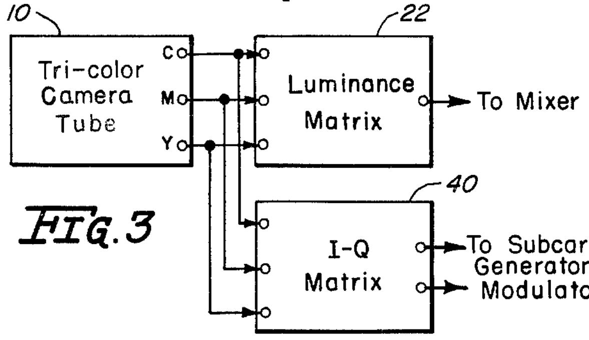

The features of the present invention which are believed to be novel, are set forth with particularity in the appended claims. The organization and method of the invention, together with further objects and advantages therefor, may best be understood by reference to the following description taken in connection with the accompanying drawings, in the several figures of which like reference numerals indicate like elements, and in which:

FIGURE 1 is a schematic representation of the transmitting end of a color system which may practice the present invention;

FIGURES 1*a* and 1*b* are fragmentary views of the target assembly of the tri-color camera tube which may be employed in the transmitter of FIGURE 1;

FIGURE 2 is a schematic representation of a color television receiver for utilizing a transmission originating at the apparatus of FIGURE 1; and FIGURE 3 represents a portion of the transmitter of FIGURE 1 in modified form.

Referring now more particularly to FIGURE 1, the color transmitter there represented comprises a tri-color camera tube 10 which may be of the vidicon type. Such a camera tube is known in the art and has been described hereinabove but the changes required in the structure to practice the present invention are represented in the fragmentary views of FIGURES 1*a* and 1*b*. The tube has an enclosing envelope 11 with an end plate or image section 12. Three different series of elemental color filters are laid down on the inner surface of envelope section 12. As shown, the filter elements are arranged in a regularly recurring series of vertically arranged filter strips as described above but in this instance, however, use is made of the subtractive primaries rather than the additive primaries of the prior art. In other words, the complements of the three primary colors are used and these complementary colors are known as magenta or minus green, cyan or minus red, and yellow or minus blue. The complementary filters individually absorb but one primary color and transmit the other two which is in sharp contrast with the additive primary color filters which absorb two primary colors and transmit but one. The application of letters C, M and Y shows the arrangement to be a periodically repeating sequence of cyan, magenta and yellow.

Conductive strips 13 which are transparent to light overlie the individual filter elements, there being one such conductive strip for each filter element. The conductors associated with the cyan filter are designated 13*c*; that over the magenta filter are designated 13*m*; while the conductors over the yellow filter are designated 13*y*. The several conductors 130 are connected together and to a load impedance 14*c* from which an output signal S*c* is derived. In similar fashion the several conductors 13*m* connect to one another and to a common load impedance 14*m* from which a second electrical signal S*m* is obtained. Similarly, conductive strips 13*y* connect to one another and to a common load impedance 14*y* at which the third electrical signal S*y* is derived. The usual photoconductive layer 15 is applied over conductive strips 13.

In order to develop the signals S*c*, S*m*, and S*y*, it is necessary that an electron beam scan the described target structure and this is accomplished under the influence of a scanning system 20 which applies to the line and field deflection elements associated with camera tube 10 signals of appropriate wave form and frequency to cause the beam of the tube to be swept over its target in a repeating series of spaced parallel lines. Timing of the scanning process is controlled by the usual timing generator 21 which applies line and field timing pulses to scanning system 20.

Camera tube 10 has three output terminals designated C, M and Y at which the signals S*c*, S*m* and S*y* are available and these terminals connect to the input terminals of a matrix network 22 wherein the applied signals are combined to derive the luminance signal that is usually transmitted in accordance with the present day practice of color television for the purpose of compatibility in respect of monochrome receivers that receive the transmission. It is of course well understood that the luminance signal is a combination of the red, blue and green color signals representing the object being televised and, as will be made clear presently, a direct conversion may be made from the complementary to the primary signals or to the luminance signal. This may take place within matrix 22. A mixer amplifier 23 has input terminals connected to the output of matrix 22 and timing generator 21 in order to develop a composite television signal comprised of video information, blanking pulses and the customary line, field and equalizing pulses. The output of mixer 23 is coupled to a carrier signal generator and modulator 24 to which a transmitting antenna 25 is likewise coupled.

For the embodiment of the invention under consideration, it is contemplated that the complementary signals be transmitted to receivers by way of complex modulation of a color subcarrier signal in much the same fashion as color information is transmitted as complex modulation of a color subcarrier in practicing the so-called NTSC form of color television. Accordingly, the transmitter also includes a subcarrier generator and modulator 26 having modulating input terminals connected to the output terminals C, M and Y of camera tube 10 and having an output terminal connected with a modulating input of the modulator in unit 24.

Inasmuch as it is convenient to consider the overall system operation at one time, the structure of a representative receiver will be described before the operation is set forth. As represented in FIGURE 2, the receiver has an antenna 30 to which the usual receiving circuits 31 are connected. These circuits comprise the stages of radio-frequency amplification, the converter and local oscillator, and intermediate-frequency amplifier all of which may be of conventional construction. Following these circuits are a luminance demodulator and amplifier 32 which is coupled with an intensity modulating input circuit of a tri-color reproducing system 33. A chroma demodulator 34 is also coupled to the output of receiving circuits 31 and its output, in turn, is connected to an $R-G-B$ matrix 35. The output terminals of this matrix are likewise connected with intensity modulating inputs of image reproducer 33.

It has been convenient to omit any discussion of the sound system normally embodied in any television system. Most generally this is of the intercarrier type the details of which are thoroughly understood in the art. In like fashion, it has been convenient to omit a separate showing of the automatic gain control, synchronizing signal separator and scanning system of the receiver. These features will, of course, be included and will have conventional construction.

In operation, an image of the object to be televised is focused upon image area 12 of the tri-color tube to establish on photoconductor 15 a charge image determined by the light distribution over the photoconductor layer and, since the light incident upon that layer passes through the filter arrangements, the image is also a manifestation of the color content of the object being televised in the reference of the complementary colors. The deflection signals supplied by scanning system 20 to the camera tube cause the electron beam thereof to course over photoconductor 15 and effect scanning of the object to be televised individaully through each of the three filter arrangements which, respectively, transmit one of the three complementary colors thereby to develop a first set of three color signals collectively representing the chromaticity of the object in terms of a first color reference, namely, the complementary colors. This set of three color signals is available at terminals C, M and Y and are combined in matrix 22 to develop and supply to mixer 23 the luminance signal. At the same time, the blanking, synchronizing and equalizing pulses are applied to mixer 23 wherein the conventional composite television signal is produced. Concurrently, the three color signals from camera tube 10 are applied to the modulation input terminals of unit 26 wherein a color subcarrier is phase and amplitude modulated in the manner of the present day NTSC practice for the purpose of transmitting the first set of color signals to receivers. The composite signal of mixer 23 and the modulated color subcarrier from unit 26 are supplied to the modulator of unit 24 to the end that a carrier signal modulated with the composite television signal and with the phase and amplitude modulated color subcarrier signal is transmitted from antenna 25.

Upon being intercepted by receiving antenna 30 and translated in conventional fashion to the receiving circuits 31 of the receiver, the program signal is delivered to luminance demodulator 32 wherein the composite television signal is recovered through demodulation. The luminance signal is applied to one modulating input of image reproducing system 33 and the synchronizing components are supplied to the scanning arrangement of the reproducing system. At the same time the signal output from receiving circuits 31 is delivered to chroma demodulator 34 which develops and presents at its output terminals the first set of three color signals. This set of color signals is matrixed in matrix 35 which derives therefrom a second set of three color signals collectively representing the chromaticity of the object being televised in terms of a second color reference, specifically, in terms of the additive primary colors. This second set of three color signals is delivered to image reproducing system 33 where, the conjunction with the luminance signal, they control the image reproducer to synthesize an image in simulated natural color.

The matrix equation for unit 22 which is to be satisfied to develop the luminance signal from the set of complementary signals is as follows:

$$\bar{Y}=.8Y(\text{yellow})+.4C-.2M \qquad (1)$$

In Equation 1 the symbol $\overline{Y}$ is the conventional designation of the luminance signal and the designation Y is the yellow component of the three complementary colors.

It is apparent from Equation 1 that the matrix network will include phase inverters in order that both polarities of the complementary signals may be available as required to accomplish the necessary matrixing specified by Equation 1.

The equations for matrix 35 which permit deriving the primary additive colors from the complementary colors are as follows:

$$R=M+Y-C \quad (2)$$

$$G=Y+C-M \quad (3)$$

$$B=M+C-Y \quad (4)$$

It will be understood that matrix 22 in FIGURE 1 has been provided to have the system compatible, that is to say, to permit monochrome receivers to make use of the broadcast even though their reproduction is in black and white. If compatibility is not a requirement, this matrix may be omitted and the complemetary colors only be sent to the receivers, of course, along with the necessary timing information of the synchronizing components.

The complete system represented by FIGURES 1 and 2 features the conversion from the set of complementary color signals to the primary color signals at the receiver, but this conversion may, if desired, be accomplished at the transmitter with the modification of FIGURE 3. In this case, a matrix 40 is interposed in the connection between the output terminals of camera tube 10 and the modulating input terminals of modulator 26. It is designated the $I-Q$ matrix and is very similar to the NTSC practice in that it permits the color subcarrier to be modulated by color difference signals. The matrix equations that are to be satisfied are as follows:

$$I=.56M+.64Y-1.20C \quad (5)$$

$$Q=1.04M-.62Y-.42C \quad (6)$$

The described color systems have the distinct advantage of higher sensitivity over previous systems wherein the color fields are derived by projecting an image of the object to be televised through filters. For example, where the image is translated by a filter which transmits a single one of the primary colors, it has a maximum light output of approximately 30% whereas the complementary filters featured in the described systems translate a pair of the primary colors and therefore make at least twice as much light available in the derivation of the television signals. While the sensitivity is greatly enhanced due primarily because of the greater efficiency of the filters, the gamut which is now determined by the complementary colors is restricted but this restriction is overcome and full color fidelity is imparted to the system by the conversion matrix which changes from the set of complementary signals to the set of additive primary color signals. In end result, the system has improved sensitivity and the capability of full color fidelity.

While particular embodiments of the invention have been shown and described, modifications may be made, and it is intended in the appended claims to cover all such modifications as may fall within the true spirit and scope of the invention.

I claim:

1. In a color television system, the method of translating an image of an object which comprises the following steps:

projecting an optical image of said object through a uni-planar filter system consisting of interspersed contiguous minus red, minus green and minus blue filter elements to develop a modified image composed of three complementary primary color components;

developing an electrostatic charge image of said modified image;

scanning said charge image to develop a first set of three color signals individually including two additive primary color components and collectively representing the luminance and chromaticity of said object in terms of a first color reference;

deriving from said first set of color signals a second set of color signals collectively representing the luminance and the chromaticity of said object in terms of a second color reference;

and utilizing said second set of color signals to reconstitute an image of said object in simulated natural color.

2. In a color television system, the method of translating an image of an object which comprises the following steps:

projecting an optical image of said object through a uni-planar filter system consisting of interspersed contiguous minus red, minus green and minus blue filter elements to develop a modified image composed of three complementary primary color components;

developing an electrostatic charge image of said modified image;

scanning said charge image to develop a first set of three color signals individually including two additive primary color components and collectively representing the luminance and chromaticity of said object in terms of the subtractive colors cyan, magenta and yellow;

deriving a luminance signal from said first set of color signals;

transmitting said first set of color signals and said luminance signal to a receiver;

deriving at said receiver a second set of color signals from said transmitted first set of color signals, said second set of color signals collectively representing the luminance and chromaticity of said object in terms of the additive primary colors red, green and blue;

and utilizing said luminance signal and said second set of color signals to reconstitute an image of said object in simulated natural color.

3. In a color television system, the method of translating an image of an object which comprises the following steps:

projecting an optical image of said object through a uni-planar filter system consisting of interspersed contiguous minus red, minus green and minus blue filter elements to develop a modified image composed of three complementary primary color components;

developing an electrostatic charge image of said modified image;

scanning said charge image to develop a first set of three color signals individually including two additive primary color components and collectively representing the luminance and chromaticity of said object in terms of the subtractive primary colors cyan, magenta and yellow;

deriving from said first set of color signals a luminance signal, an I signal and a Q signal, said derived signals collectively representing the luminance and chromaticity of said object in terms of the additive primary colors red, green and blue;

transmitting said luminance, I and Q signals to a receiver;

and utilizing said transmitted signals to reconstitute an image of said object in simulated natural color at said receiver.

4. In a color television system, the method of translating an image of an object which comprises the following steps:

projecting an optical image of said object through a uni-planar filter system consisting of interspersed contiguous minus red, minus green and minus blue filter elements to develop a modified image composed of three complementary primary color components;

developing an electrostatic charge image of said modified image;

scanning said charge image to develop a first set of three color signals individually including two additive primary color components and collectively representing the luminance and chromaticity of said object in terms of the subtractive primary colors cyan, magenta and yellow;

deriving from said first set of color signals an I signal and a Q signal collectively representing the chromaticity of said object in terms of the additive primary colors red, green and blue;

modulating a color subcarrier signal with said I and Q signals;

deriving a luminance signal from said first set of color signals;

modulating a carrier signal with said luminance and subcarrier signals;

transmitting said carrier signal to a receiver;

and utilizing said transmitted signal to reconstitute an image of said object in simulated natural color at said receiver.

References Cited by the Examiner

UNITED STATES PATENTS

| | | | |
|---|---|---|---|
| 2,645,976 | 7/1953 | Goldsmith | 178—5.2 |
| 2,733,291 | 1/1956 | Kell | 178—5.4 |
| 2,734,939 | 2/1956 | Houghton | 178—5.4 |
| 2,748,189 | 5/1956 | Bedford | 178—5.4 |
| 2,900,441 | 8/1959 | Huntley | 178—5.4 |
| 3,053,931 | 9/1962 | Rudatis | 178—5.2 |

DAVID G. REDINBAUGH, *Primary Examiner.*

ROBERT SEGAL, *Examiner.*

ROBERT L. GRIFFIN, *Assistant Examiner.*